Patented Oct. 9, 1951

2,570,443

UNITED STATES PATENT OFFICE 2,570,443

METHOD OF PRODUCING PRODUCTS OF ANIMAL FIBERS

James W. Hall, Elwyn, John P. Hollihan, Jr., Garden City, and Frederick F. Morehead, West Chester, Pa., assignors to American Viscose Corporation, Wilmington, Del., a corporation of Delaware No Drawing. Application November 24, 1945,
Serial No. 630,686

7 Claims. (Cl. 18—54)

This invention relates to processes for producing suture material and similar products.

Up to the present, catgut prepared by twisting together strips cut from animal intestines has been the most commonly used suture material. However, while catgut sutures have the advantage of high tenacity, a good grade having a tenacity of about 4 to 4.5 gms./denier, they have the major shortcoming that, although the intestines from which they are prepared are protein in character, the precise constitution of the intestines differs from one animal to another, and the sutures prepared from the intestines of different animals also exhibit variations which are most marked in the time required for the sutures to be absorbed by the human organism. Some catgut sutures are absorbed by the human organism in a matter of hours, which is too rapid in many cases, whereas other catgut sutures are absorbed only after an unduly prolonged time, or not at all. Of course, serious results follow if the suture disintegrates and is absorbed before a wound is healed, or if the suture is not completely absorbed when a wound is entirely healed. This variation in the time in which catgut sutures are absorbed by the human organism has been so troublesome that attempts have been made to circumvent the difficulties by marketing the material according to grades, but even this precaution has not wholly eliminated the problem.

Since catgut sutures are usually made by manually twisting three or four flat twisted strips of catgut together, there may even be variations in the rate of absorption by the human organism, as well as variations in strength, as between different portions of the same suture.

A need exists for threads suitable for use as suture material which at least approximate or equal catgut in tensile strength, and which are absorbed by the human organism in an optimum period of time which is uniform for all sutures comprising the material.

Previously, it has been proposed to prepare sutures or like products from fibers which occur naturally in the sinews or tendons of large animals, such as beef tendons, but prior to our investigations threads comprising such fibers and having sufficiently high tenacity to warrant substitution thereof for catgut in stitching up wounds have not been available.

In preparing sutures from the fibers occurring in such animal parts, the earlier practice was to grind the starting material, such as beef tendons, in a colloid mill. It was found that threads formed from the ground material were lacking in strength, and useless.

Since then, the art has emphasized the necessity for maintaining the fibers in the elementary form in which they occur naturally in beef tendons or like animal parts, and precautions have been taken not only to preserve the fibrous character of the fibers, but also to maintain the fibers as long as possible, the supposition being that only by taking such precautions could strong threads be obtained.

The fibers which occur naturally in the commercially practicable sinews or tendons of the larger animals, such as beef tendons, are very thin and undesirably long, having a length of several inches, in most cases. Even in those cases where the tendons or sinews have been subdivided prior to separating the fibers therefrom, care has been taken to maintain the fibers as long as possible, and the fibers have had a length of at least about one centimeter.

Threads or filaments obtained from suspensions of these long fibers, in accordance with prior practice, have not shown exceptional strength, although they are superior in that respect to threads formed from ground material. Threads or filaments comprising fibers having a length of one centimeter have a strength of only about 3 gms./denier, which does not compare favorably with the tenacity of a good grade of catgut. Further, the suspensions of the long or comparatively long fibers are extremely viscous and can only be extruded, at a slow rate of speed, through a long, comparatively wide tube such that relatively coarse filaments of large denier of the order of 35 denier per filament are obtained. Such suspensions cannot be extruded through a short narrow tube to form finer filaments because the suspension does not flow smoothly through the short tubes even at high pressures.

Our photo-micrographs and electron-micrographs reveal that the long fibers which constitute the structural basis of the prior art suspensions are not aligned in well oriented bundles along the filament axis but are enmeshed with one another and lie in tangled masses. The presence of such tangled masses in the suspensions accounts for the comparatively low strength of threads formed therefrom, and for the difficulties encountered in spinning the suspensions.

We have now found that, while it is important to the production of high tenacity threads to maintain the fibrous structure of the animal fibers occurring in beef tendons, for instance, in preparing suspensions thereof suitable for spinning, the presumption of the art that the fibers must be preserved in the long condition is erroneous and that, in fact, strength in the final threads is materially decreased by too great length of the constituent fibril structures.

We have discovered, and this discovery is the basis of our present invention, that by cutting the fibers into segments having a selectively controlled length measurable in millimeters, while maintaining their fibrous character, preliminary to the preparation of suspensions thereof suitable for spinning into threads or filaments, a remarkable increase in the tensile strengths of the final threads is achieved. Thus we have found that when the fibers occurring naturally in beef tendons or the like are cut to a length measurable in millimeters, the threads obtained from suspensions of the fibers in suitable swelling agents have tensile strengths of the order of 4 to 4.8 gms./denier.

Like catgut, the new sutures are protein in nature and absorbable by the human organism. However, the new sutures are superior to catgut because all of the new sutures are absorbed by the human organism in about the same period of time. Since the spinning gels from which the sutures are obtained comprise a blend of a considerable quantity of protein material, and are always essentially the same, the threads obtained by spinning the gels into appropriate media, are also always essentially the same, and a multiplicity of sutures may be obtained all of which have the same properties. Results obtained in one case can be readily duplicated as desired, and the sutures can be used with confidence. The new sutures are superior to sutures previously obtained from suspensions of the elementary fibers occurring in beef tendons, or fibers having a length measurable in centimeters, due to the increased tenacity by which they are characterized. The suspensions comprising the cut fibers do not tend to plug the spinning jets as do the suspensions comprising the longer fibers, and emerge from the jets more smoothly, so that the filaments obtained are uniform and even along their length and do not show weakened portions such as are noticeable in the case of filaments obtained from the prior art suspensions. The cut fibers having the selectively controlled length, align themselves in well oriented bundles along the filament axis which makes for uniform high strength in the final products. Further, we have found that, since the cut fibers do not lie in tangled masses in the suspensions, as do the longer fibers, it is possible, if desirable, to extrude the suspensions of the cut fibers through a short, narrow tube, which makes for higher spinning speeds and permits the production of relatively fine filaments. We have obtained filaments as fine as filaments of 10 denier per filament in this manner which, due to the combination of high strength and comparative fineness, are useful for a number of special purposes.

The length of the cut fibers may vary, but in general we prefer to cut the elementary fibers into segments having a controlled length of from about 0.1 to 5.0 mm., and most desirably, a controlled length of from about 0.5 to 1.0 mm.

The fiber suspensions may be prepared in any suitable manner. For instance, the starting material, which may be a commercially practicable animal sinew or tendon, for example a beef tendon, may be subjected to a mechanical teasing operation to separate the fibers therefrom, the conditions of separation being such that the fiber structure is not impaired and the teased out fibers may then be cut to obtain segments having the controlled length indicated, after which the cut fibers may be suspended in a suitable swelling liquid, such as malonic acid, for example, to obtain a suspension of the swollen fibers in desired concentration. The suspension may then be extruded to form filaments or threads which, after washing at controlled pH are dried, preferably under a stretching tension.

Alternatively, the starting material, such as beef tendon, may be hardened by treatment with Dry Ice and then sliced or shaved in such a manner that the fibers present therein are cut to the desired short lengths, the fiber form being preserved. The sliced or shaved tendon may then be subjected to the action of a swelling medium from which a suspension of the precipitated highly swollen short fibers may be separated. The fiber suspension may then be extruded into an appropriate coagulating and/or dehydrating medium and the resultant threads comprising an integral mass of the cut fibers may be washed and finished for use as previously described.

Instead of swelling and separating the fibers in a single operation by treating the sliced or shaved tendon with a large quantity of swelling agent, the subdivided tendons may first be treated with a smaller quantity of swelling agent, with accompanying teasing out of the short fibers, and the additional amount of swelling agent required to effect the desired swelling of the fibers may then be added either during or after the separation of the fibers.

Any suitable swelling agent known to the art may be employed, such as dilute solutions of organic or inorganic acids or acid-reacting compounds, the concentration of the swelling agent in the bath being dependent on the nature of the particular swelling agent chosen and whether it is desired to prepare a relatively thin fiber suspension or a more highly viscous suspension. In general, the suspensions comprising the cut fibers in accordance with our invention are thinner and more readily extrudable than suspensions comprising the elementary or longer fibers wherein the fibers are tangled together.

The suspensions of the cut fibers may be extruded into any suitable coagulating and/or dehydrating medium but liquids of low viscosity are preferred. Acetone has been found a most satisfactory medium for effecting precipitation and dehydration of the protein material, both of which are necessary for obtaining satisfactory fibers.

The threads obtained by extruding the suspensions of the cut fibers may be treated with suitable conditioning agents if desired. For example, they may be impregnated with iodine and similar germicidal or like agents to enhance their usefulness as sutures; also they may be tanned as by treatment with croming materials, or they may be hardened by treating them with indurating substances, such as formaldehyde.

For some purposes the threads or filaments obtained by spinning the suspensions of animal fibers which have been reduced in length may be cut to staple fiber length and admixed with other fibers such as wool, flax, cotton, silk, regenerated cellulose or other artificial fibers to produce mixed structures. Yarns or the like comprising the mixed fibers may be formed into structures of various types in accordance with usual fabricating procedures.

Instead of sutures, products useful for other

We claim:

1. A method for manufacturing products comprising fibers which occur naturally in beef tendons which comprises cutting the fibers to a selectively controlled length in the range from 0.1 to 5.0 mm., suspending the cut fibers in a swelling liquid, and forming the suspension into products of a predetermined shape.

2. A method for manufacturing products comprising fibers which occur naturally in beef tendons which comprises cutting the fibers to a selectively controlled length in the range from 0.5 to 1.0 mm., suspending the cut fibers in a swelling liquid, and forming the suspension into products of a predetermined shape.

3. A method of manufacturing products comprising fibers which occur naturally in collagenous animal materials, said fibers having, in their natural state, a length of at least 1 centimeter, which comprises cutting the fibers to a selectively controlled length in the range from 0.1 to 5.0 mm., suspending the cut fibers in a swelling liquid, and forming the suspension into products of a predetermined shape.

4. A method of manufacturing products comprising fibers which occur naturally in collageneous animal materials, said fibers having, in their natural state, a length of at least 1 centimeter, which comprises cutting the fibers to a selectively controlled length in the range from 0.5 to 1.0 mm., suspending the cut fibers in a swelling liquid, and forming the suspension into products of a predetermined shape.

5. A method of manufacturing continuous filaments and threads of indefinite length consisting substantially entirely of fibers which occur naturally in collagenous animal materials, said fibers having, in their natural state, a length of at least 1 centimeter, which comprises cutting the fibers to a selectively controlled length in the range from 0.1 to 5.0 mm., suspending the cut fibers in a swelling liquid, and extruding the suspension into a setting medium.

6. A method of manufacturing continuous filaments and threads of indefinite length consisting substantially entirely of fibers which occur naturally in beef tendons which comprises cutting the fibers to a selectively controlled length in the range from 0.1 to 5.0 mm., suspending the cut fibers in a swelling liquid, and extruding the suspension into a setting medium.

7. A method of manufacturing continuous filaments and threads of indefinite length consisting substantially entirely of fibers which occur naturally in collagenous animal materials, said fibers having, in their natural state, a length of at least 1 centimeter, which comprises cutting the fibers to a selectively controlled length in the range from 0.5 to 1.0 mm., suspending the cut fibers in a swelling liquid, and extruding the suspension into a setting medium.

JAMES W. HALL.
JOHN P. HOLLIHAN, JR.
FREDERICK F. MOREHEAD.

REFERENCES CITED

The following references are of record in the file of this patent:

UNITED STATES PATENTS

| Number | Name | Date |
| --- | --- | --- |
| 861,231 | Clark | July 23, 1907 |
| 1,254,031 | Davis | Jan. 22, 1918 |
| 1,934,413 | Esselen | Nov. 7, 1933 |
| 1,949,111 | Randall | Feb. 27, 1934 |
| 1,999,641 | Sharp | Apr. 30, 1935 |
| 2,039,262 | Schulte | Apr. 28, 1936 |
| 2,120,851 | Becker et al. | June 14, 1938 |
| 2,167,251 | Rogers | July 25, 1939 |

FOREIGN PATENTS

| Number | Country | Date |
| --- | --- | --- |
| 482,628 | Great Britain | Apr. 1, 1938 |

OTHER REFERENCES

Page 90 of "A Text-Book of Paper Making," by Cross and Bevan, 4th edition, published in 1916 by Spohn and Chamberlain, 123 Liberty St., New York city, N. Y. (A copy is available in Division 56 in the U. S. Patent Office.)

The Rayon Industry, by M. Avram, 1929, pp. 470–471. (Copy in Div. 15.)